May 21, 1935.  H. H. FREED ET AL  2,002,393
AUTOMATIC PANTOGRAPH MACHINE
Filed Dec. 13, 1932  3 Sheets-Sheet 1
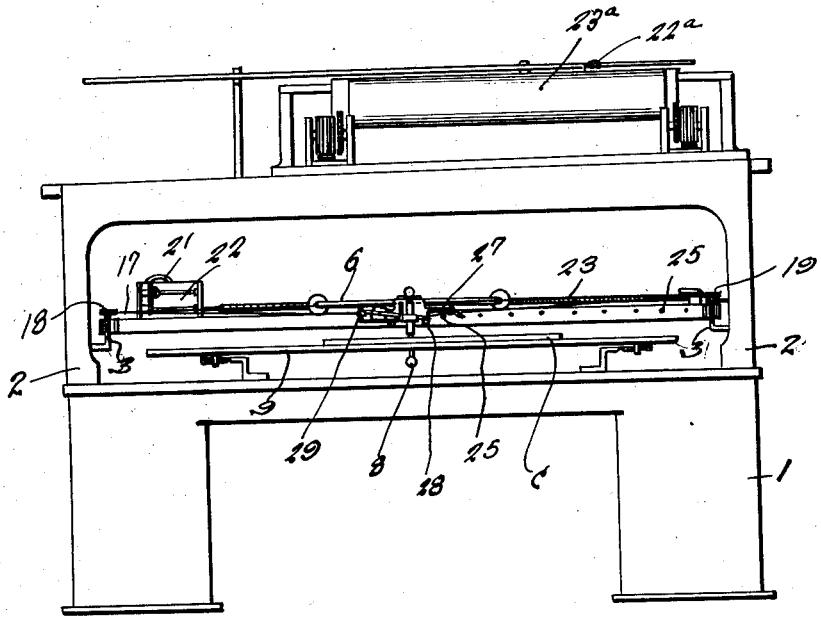
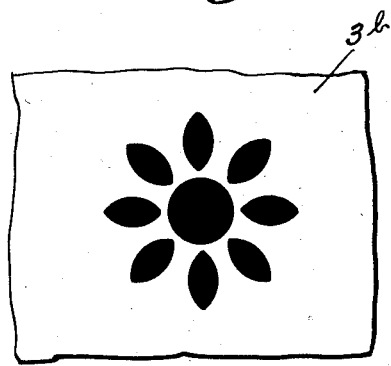
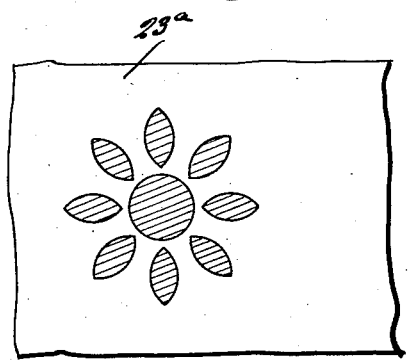
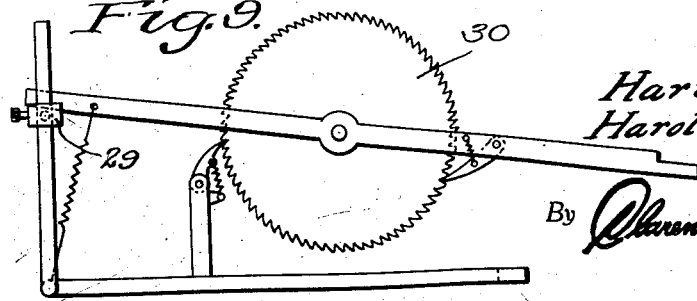
Inventors
Harvey H. Freed
Harold B. Mann
By Clarence A. O'Brien
Attorney May 21, 1935. H. H. FREED ET AL 2,002,393
AUTOMATIC PANTOGRAPH MACHINE
Filed Dec. 13, 1932 3 Sheets-Sheet 2
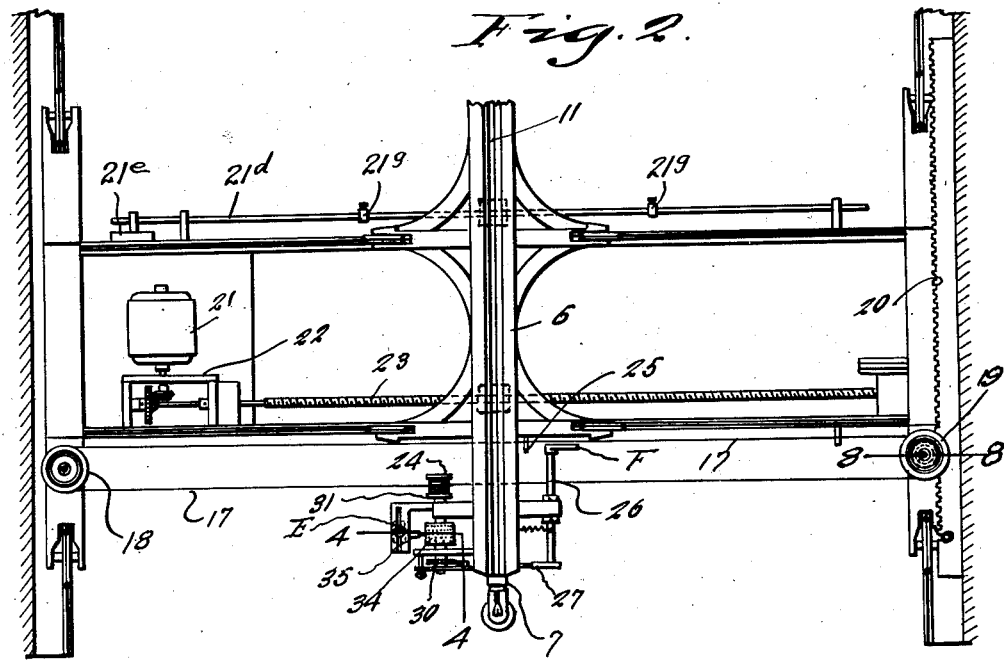
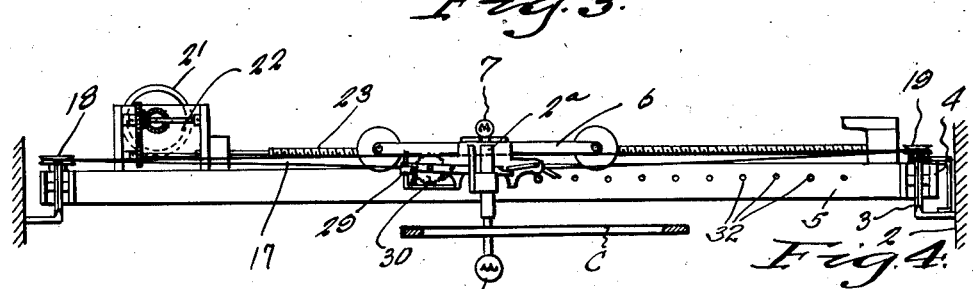
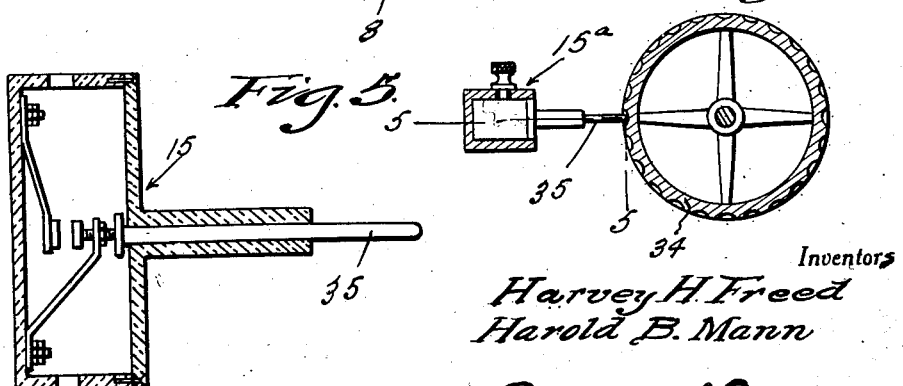
Inventors
Harvey H. Freed
Harold B. Mann
By Clarence A. O'Brien
Attorney May 21, 1935. H. H. FREED ET AL 2,002,393
AUTOMATIC PANTOGRAPH MACHINE
Filed Dec. 13, 1932 3 Sheets-Sheet 3
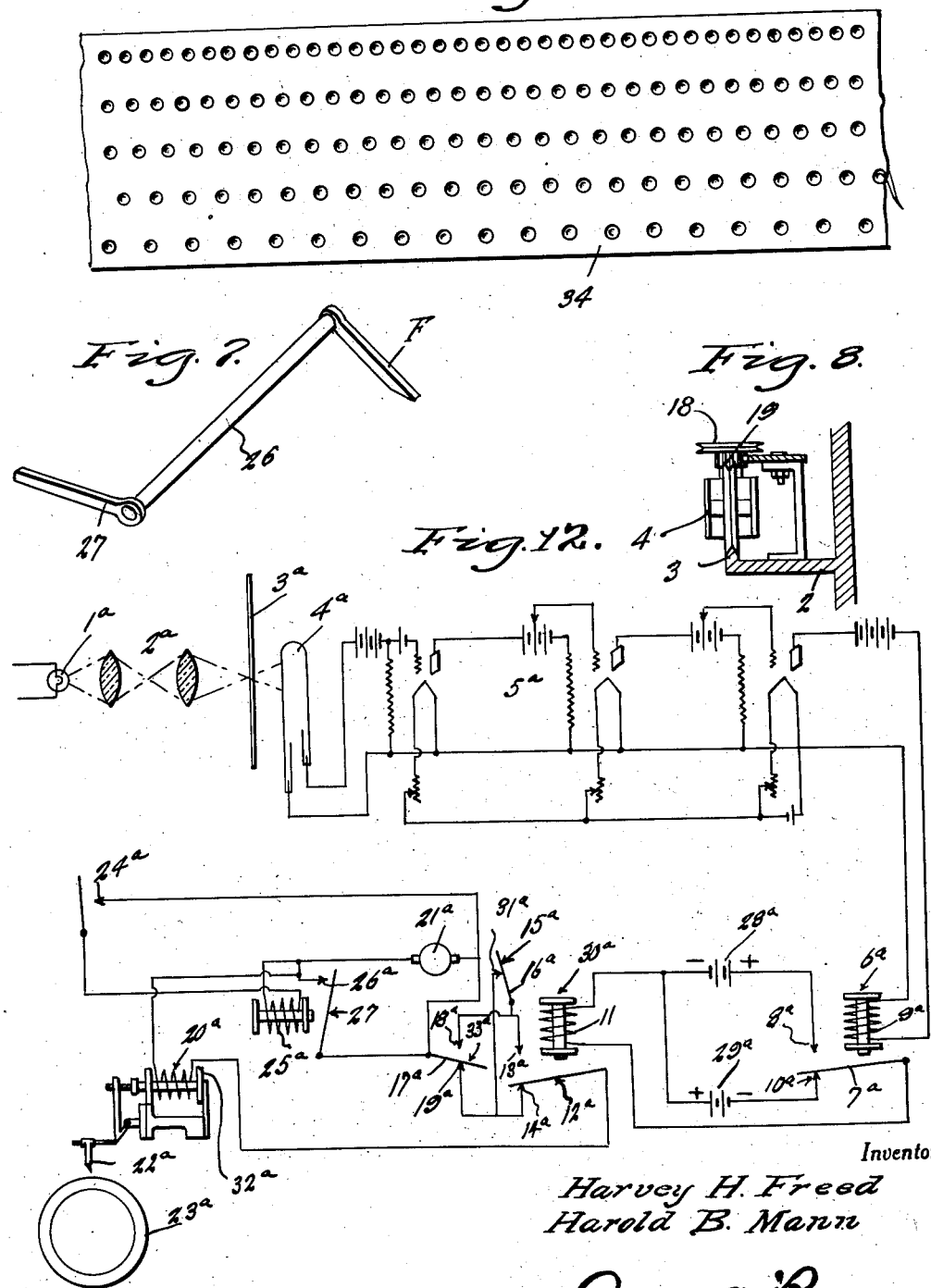
Inventors
Harvey H. Freed
Harold B. Mann
By Clarence A. O'Brien
Attorney Patented May 21, 1935

2,002,393

UNITED STATES PATENT OFFICE 2,002,393

AUTOMATIC PANTOGRAPH MACHINE

Harvey Henry Freed, Belleville, and Harold Bickley Mann, Newark, N. J.

Application December 13, 1932, Serial No. 647,026

3 Claims. (Cl. 33—23)

This invention relates to certain new and useful improvements in a pantograph and it has for its principle object to provide an improved mechanism and construction wherein through photoelectric and electrical means the cutter or cutters may be controlled by a ray of light, photoelectric cell and their association to and cooperation with the design; to render said cutter or cutters operative or inoperative depending upon the nature of the intensity or absence of light between the design and the photo-electric cell.

The invention is found to reside in an improved pantograph construction wherein the photo-electric pick up and its carriage is continuously reciprocated across the design at an angle of twenty-two and one half degrees and has associated means for advancing or moving the photo-electric pick up carriage step by step or intermittently in a direction transversely with respect to the reciprocatory motion of the carriage whereby the entire design will eventually be traced by the ray of light and the photo-electric pick up in parallel predetermined lines.

The invention further resides in providing an exciting ray of light of infinitely small diameter which is made to scan across the design at an angle of twenty-two and one-half degrees. The varying light impulses are in turn picked up by the photo-electric cell which is in either a plane of the refracted light for non-transparent designs and under or behind the design in a line with the exciting ray of light in the case of transparent designs.

A further object of this invention is to provide a net work of relays between the photo-electric pick up and the magnetic cutter or cutters which function to make an outline of the design; and also to provide parallel lines across the outline, between the outline lines, at an angle of twenty-two and one-half degrees with the horizontal.

The invention also has for its object the provision of the variable motion transmitting mechanism between the photo-electric pick up and the cutter support and between the photo-electric pick up and the work support.

Various other important objects and advantages of the invention will become apparent to the reader of the following specification.

In the drawings:—

Figure 1 represents a front elevational view of a pantograph machine with the invention installed thereon.

Fig. 2 represents a fragmentary top plan view of the improved portion of the pantograph machine.

Fig. 3 represents an end elevational view of the structure shown in Fig. 2.

Fig. 4 represents a detailed sectional view taken substantially on line 4—4 of Fig. 2.

Fig. 5 represents a sectional view taken substantially on line 5—5 of Fig. 4.

Fig. 6 represents a pattern of the switch operating rotor shown in Fig. 4.

Fig. 7 represents a perspective view of the transverse carriage operating shaft.

Fig. 8 represents a fragmentary detailed sectional view taken substantially on line 8—8 of Fig. 2.

Fig. 9 represents a side elevational view of the step by step ratchet means.

Fig. 10 represents a fragmentary plan view of the design to be copied.

Fig. 11 represents a fragmentary plan view of the varnished cylinder after the same has been cut.

Fig. 12 represents a diagrammatic view disclosing the electrical connection between the electrical devices involved.

Referring to the drawings wherein like numerals designate like parts, it can be seen that numeral 1 designates the base of the machine having side standards 2 surmounting the same for supporting the superstructure. Between the standards 2, a pair of rails 3 are mounted on the base 1 and are run forward and backward. Supported on these rails 3 by wheels 4 is a carriage 5 which in turn supports a superposed wheeled carriage 6 for transverse movement. A forward extending photo-electric cell supporting arm 7 carries the pick up equipment 8 for operating over the design support 9 upon which the pattern C is supported and which is held to the frame or base 1. The carriage 6 is provided with a grooved track 11 in which is carried seated wheels which go to make up actuating means of the moving arms of a regular pantograph.

An endless band 17 is trained over pulleys or wheels 18 rotatably supported at opposite ends of the carriage 5, one being fixed to a gear wheel 19, see Figure 8, that meshes with the rack 20 which derives its power from the motion of the carriage 6 when said carriage 6 is operated by the screw 23, gears 22 and motor 21, so as to drive through the band 17 the switch cylinder 34. A reversing switch 21ᵉ is provided for the motor 21, this being actuated by a rod 21ᵈ having adjustable collars 21ᶠ thereon with which the carriage is engageable to shift said rod 21ᵈ.

The advancing of the pick up carriage 6 in a direction transversely with respect to the reciprocatory motion is obtained by the mechanism at E. As the carriage 6 travels in the reciprocating motion on carriage 5 the arm 26 strikes pin 25 which pushes lever 27 in a downward direction through shaft 26. As arm 27 moves downward it moves 28 in the same direction and with the same magnitude. The magnitude of the movement of the arm is controlled by the position of the stop 29. As arm 28 is moved its motion is transmitted to drum wheel 24 by the ratchet and pawl 30 and the shaft 31. The rotation of the wheel 24 sends the carriage 5 backward by a distance determined by the setting of the stop 29 through the endless band 17, the wheel 18, the gear 19, and the rack 20. The setting of the pin 25 in any of the holes 32 for the distance travelled by carriage 6 will change the advancing of the carriage at either or both ends of the travel of the carriage 6. This advancing of the carriage intermittently produces the parallel lines between the outline lines of the design at intervals determined by the setting of plunger 35 along the slotted cylinder 34.

It will be understood that the cylinder 23a of the conventional pantograph mechanism is rotated through an arc equal to the travel of the back and forth motion of the carriage 5 with a one to one setting of the pantograph arms. This is accomplished conventionally and is a means well known in the art and forms no part of the present invention. The reciprocating motion of the carriage 6 causes the cutter holding bar 2' to travel the same distance as the carriage with a one to one setting of the pantograph arms shown at the top of Figure 1. By the combining of these two motions through the band, the gear and the rack 17, 18 and 19, respectively the resultant motion is a reciprocating motion of the pick up arm 7 and the cutter 3' on an angle of twenty two and one half degrees with the horizontal.

Referring now to the wiring diagram, the following will analyze the electrical circuit.

The numeral 1a designates the source of illumination in the form of an incandescent lamp of high intensity. The rays of light from the lamp cast an illuminated area on the optical system 2a, which is adjusted with the necessary aperture and lenses to bring the rays to a focal point on the design 3a. The diverging rays are picked up by the photo-electric cell 4a which in the case of where the design is on a transparent body the photo-electric cell will be directly behind or under the design as shown in the drawings. If the design is on a non-transparent body the photo-electric cell will be in the plane of the reflected light.

As the arm 7 scans the design with the motions previously described the light beam is interrupted by the design; and these interruptions set up electrical impulses in the photo-electric cell. The impulses set up in the cell are amplified by the direct current amplifier 5a which produces an amplification of the current impulses to such a magnitude that the relay 6a is actuated. When the current from the amplifier raises from zero or low current to maximum caused by the change of light to dark in the photo cell, the contact 7a of relay 6a will move from the zero or low current contact 10a to the high current contact 8a due to the energizing of coil 9a. While the contact 7a is in contact with the contact 10a the polarized relay 30a has the coil 11a energized by the battery 29a and causes the contacts 12a and 14a to close.

With the rise in current from the amplifier and the change of contacts on relay 6a and 7a and 10a to 7a and 8a connects battery 28a in circuit and battery 29a out of circuit. Battery 28a has the opposite polarity of 29a and causes the contact 12a of relay 30a to swing from contact 14a to contact 13a. The contacts 13a and 14a are short circuited by key 31a, when the contacts 15a and 16a are closed and also connected to the short circuit loop is key 33a as shown in the diagram. The series circuit of the generator 21a, the magnetic cutter coil 32a and the contacts 12a, 13a and 14a of relay 30a form a closed circuit as long as contact 12a is in contact with either of the contacts 13a and 14a and the coil 32a is thereby energized. As long as the coil 32a is energized the cutting point 22a is held away from the varnished cylinder 23a; but when the series circuit is broken by the traveling of the contact 12a between contacts 14a and 13a the point 22a will come in contact with the cylinder 23 due to the de-energizing of coil 32a. The time required for the change of contacts of relay 30a is just sufficient to permit the cutting point 22a to fall on the cylinder 23a and produce a dot in the varnish. The spacing of the contacts 13a and 14a and the increase or decrease of gap between the contacts varies the thickness of the dot recorded on the cylinder. Consequently as the pick up scans the design, and the impulses of light are varied by the design, and the change in current in the relays due to the change of light, the outline of the design will be made up of an unbroken line of dots.

The function of the key 31a is to open the short circuiting loop around the contacts 13a and 14a of relay 30a. When the circuit is opened by the opening of the contacts 15a and 16a there are two separate circuits formed, that about the contact 14a and the other about 13a. The circuit of contact 14a terminates at contact 19a and the circuit of 13a terminates at contact 18a. With the contacts in the post 14a the cutter circuit is closed and the cutting point 22a is away from the cylinder; but when contact 12a is in contact with contact 13a the cutter circuit is open and the cutting point 22a will make a line in the varnish on the cylinder when contacts 12a and 13a are together during the period when there is no light on the photo cell. The opening and closing of the contacts 15a and 16a of key 31a while the pick up equipment is scanning the design will give equal spaced lines across the design between the outline lines on the varnished cylinder 23a by the use of the spacing mechanism.

This spacing mechanism for producing the parallel lines across the design on the cylinder is indicated by numerals 33—34 and 35. The roller 33 has equally spaced holes 34 on its circumference. The spacing of these holes are the same for all holes around the circumference on a plane perpendicular to the axis of the roller; but the spacing of the holes is closer at one end of the roller than at the opposite end. The roller 33 is keyed to the shaft 31 Fig. 1 and is rotated the same magnitude that the carriage 5 of Fig. 1 is advanced. There is a plunger 35 which is held in contact with the surface of the roller 35 by spring tension; and when a hole in the roller is opposite the plunger falls in the hole, thus breaking the contacts 15a and 16a.

The key 33a in Fig. 17 is used for the control of the parallel lines on the design on the cylinder in such, that if the design is of the positive nature the key contacts 17a and 18a will be closed, thus placing the lines across the design in the varnish of cylinder 23a during the period of no light on the photo-cell. If the design is of the negative nature the contacts 17a and 19a will be closed and the lines will be placed in the varnish on the cylinder 23a during the period of light on the photo-cell. The key is manually operated and is set in the proper position before the machine is set in operation.

The relay 25a is used to control the opening and closing of the contacts 26a and 27a and is controlled by the switch 24a. The switch 24a is connected to the reversing mechanism which reverses the motor 21 that controls the reciprocating motion of the machine; and when the reversing switch throws switch 24a in a position such that the contacts are closed, the relay 25a closes the contacts 26a and 27a. When the contacts 26a and 27a are closed they short circuit the relay contacts 12a, 13a and 14a, thus making them inoperative while the contacts are closed. This provides for one way scanning where it is necessary for certain types of work, and the cutter point 22a is held away from the cylinder 23a, for the period that the switch 24 is closed.

Figs. 10 and 11 illustrate the design that is to be reproduced on the copper cylinder 23 and the reproduced design as it appears on the cylinder.

When the complete design has been cut in the varnished surface of the copper cylinder the cylinder is placed in a bath of nitric acid and the parts where the varnish has been scratched off by the cutter is etched leaving the reproduction of the design.

While the foregoing specification sets forth the invention in detail, it is to be understood that numerous changes in the shape, size and materials may be resorted to without departing from the spirit and scope of the invention as claimed hereinafter.

Having thus described my invention, what we claim as new is:—

1. A method of transferring the outline of any design to a textile printing surface by electrical means consisting in scanning the design with a light sensitive cell located in an amplifying system, and producing indentations on the said surface corresponding to the edges of the design, said indentations being in such proximity as to form a solid outline of the design on the printing surface.

2. A method of transferring designs to textile printing surfaces by electrical means consisting in scanning the design with a light sensitive cell located in an amplifying system affecting a magnetic cutter to form ground lines and including means for controlling said cutter so as to form indentations on said printing surface between the ends of said ground line in such proximity as to form in conjunction with the ends of the ground line a solid outline of the design.

3. An apparatus for cutting textile printing surfaces comprising an electrical system including a light sensitive cell and a magnetically operated cutter for producing ground line on the printing surface from the copy design, an auxiliary make and break circuit for actuating the cutter independently of said system to produce indentations on said printing surface between the adjacent ends of the ground line in such close proximity to each other and to the said ground line ends as to produce a solid outline for the transferred design.

HAROLD BICKLEY MANN.
HARVEY HENRY FREED.